United States Patent
Lee et al.

(10) Patent No.: US 10,524,000 B2
(45) Date of Patent: *Dec. 31, 2019

(54) MEDIA CHANNEL IDENTIFICATION AND ACTION WITH MULTI-MATCH DETECTION AND DISAMBIGUATION BASED ON MATCHING WITH DIFFERENTIAL REFERENCE-FINGERPRINT FEATURE

(71) Applicant: Gracenote, Inc., Emeryville, CA (US)

(72) Inventors: Jaehyung Lee, Seoul (KR); Dewey Ho Lee, Berkeley, CA (US); Markus Cremer, Orinda, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/017,190

(22) Filed: Jun. 25, 2018

(65) Prior Publication Data

US 2018/0310053 A1    Oct. 25, 2018

Related U.S. Application Data

(63) Continuation of application No. 15/982,437, filed on May 17, 2018, which is a continuation of application
(Continued)

(51) Int. Cl.
*H04H 60/32* (2008.01)
*H04N 21/44* (2011.01)
(Continued)

(52) U.S. Cl.
CPC ...... *H04N 21/44008* (2013.01); *H04H 60/31* (2013.01); *H04H 60/43* (2013.01);
(Continued)

(58) Field of Classification Search
CPC ......... H04N 21/44008; H04N 21/2353; H04N 21/8456; H04N 21/84; H04N 21/8358;
(Continued)

(56) References Cited

U.S. PATENT DOCUMENTS 7,461,392 B2   12/2008  Herley
7,653,921 B2   1/2010   Herley
(Continued)

FOREIGN PATENT DOCUMENTS

CN   102176208   9/2011
CN   103501449   1/2014
(Continued)

OTHER PUBLICATIONS

US 9,189,826 B1, 11/2015, Sharifi et al. (withdrawn)
(Continued)

*Primary Examiner* — Michael B. Pierorazio
(74) *Attorney, Agent, or Firm* — McDonnell Boehnen Hulbert & Berghoff LLP

(57) ABSTRACT

A computing system compares various reference fingerprints each representing a reference media stream broadcast on a different respective known channel, and the computing system determines that a plurality of the reference fingerprints match each other, thus defining a multi-match group of the matching reference fingerprints. In response, the computing system identifies a fingerprint feature that could define a distinction between the reference fingerprints, and the computing system resolves the multi-match based on the identified feature, thereby determining the channel carrying the media stream being rendered by the media presentation device. And the server then takes channel-specific action based on the determined channel.

20 Claims, 6 Drawing Sheets

Related U.S. Application Data

No. 15/442,114, filed on Feb. 24, 2017, now Pat. No. 9,992,533.

(60) Provisional application No. 62/301,616, filed on Feb. 29, 2016.

(51) Int. Cl.

| | | |
|---|---|---|
| *H04N 21/442* | (2011.01) | |
| *H04N 21/435* | (2011.01) | |
| *H04N 21/475* | (2011.01) | |
| *H04N 21/438* | (2011.01) | |
| *H04N 21/61* | (2011.01) | |
| *H04N 21/658* | (2011.01) | |
| *H04H 60/43* | (2008.01) | |
| *H04N 21/8352* | (2011.01) | |
| *H04N 21/231* | (2011.01) | |
| *H04H 60/31* | (2008.01) | |
| *H04N 21/234* | (2011.01) | |
| *H04N 21/235* | (2011.01) | |
| *H04N 21/24* | (2011.01) | |
| *H04N 21/258* | (2011.01) | |
| *H04N 21/6543* | (2011.01) | |
| *H04N 21/81* | (2011.01) | |
| *H04N 21/8358* | (2011.01) | |
| *H04N 21/431* | (2011.01) | |
| *H04N 21/84* | (2011.01) | |
| *H04N 21/845* | (2011.01) | |
| *H04H 60/56* | (2008.01) | |
| *H04H 60/65* | (2008.01) | |

(52) U.S. Cl.
CPC ... *H04N 21/2353* (2013.01); *H04N 21/23109* (2013.01); *H04N 21/23418* (2013.01); *H04N 21/2407* (2013.01); *H04N 21/25841* (2013.01); *H04N 21/431* (2013.01); *H04N 21/435* (2013.01); *H04N 21/4383* (2013.01); *H04N 21/44204* (2013.01); *H04N 21/44222* (2013.01); *H04N 21/4756* (2013.01); *H04N 21/6118* (2013.01); *H04N 21/6543* (2013.01); *H04N 21/6582* (2013.01); *H04N 21/812* (2013.01); *H04N 21/8352* (2013.01); *H04N 21/8358* (2013.01); *H04N 21/84* (2013.01); *H04N 21/8456* (2013.01); *H04H 60/56* (2013.01); *H04H 60/65* (2013.01); *H04H 2201/90* (2013.01)

(58) Field of Classification Search
CPC ......... H04N 21/2407; H04N 21/25841; H04N 21/44222; H04N 21/6543; H04N 21/812; H04N 21/23418; H04N 21/431; H04N 21/6118; H04N 21/4756; H04N 21/435; H04N 21/44204; H04N 21/4383
USPC .......................................................... 725/19
See application file for complete search history.

(56) References Cited

U.S. PATENT DOCUMENTS

| | | |
|---|---|---|
| 7,788,696 B2 | 8/2010 | Burges et al. |
| 7,797,249 B2 | 9/2010 | Schmeizer et al. |
| 7,917,645 B2 | 3/2011 | Ikezoye et al. |
| 8,150,096 B2 | 4/2012 | Alattar |
| 8,185,733 B2 | 5/2012 | Schwartz et al. |
| 8,510,770 B1 | 8/2013 | Oztaskent et al. |
| 8,649,659 B2 | 2/2014 | Lalwaney |
| 8,700,194 B2 | 4/2014 | Bauer et al. |
| 9,094,715 B2 | 7/2015 | Neumeier et al. |
| 9,203,538 B2 | 12/2015 | Anniballi et al. |
| 9,240,851 B2 | 1/2016 | Park |
| 9,275,427 B1 | 3/2016 | Sharifi |
| 9,412,330 B2 | 8/2016 | Keating et al. |
| 9,465,995 B2 | 10/2016 | Harron et al. |
| 9,609,391 B2 | 3/2017 | Oztaskent et al. |
| 9,635,417 B2 | 4/2017 | Grant et al. |
| 9,704,016 B2 | 7/2017 | Jang et al. |
| 9,706,261 B2 | 7/2017 | Chen |
| 9,906,843 B2 | 2/2018 | Yabu et al. |
| 9,967,613 B2 | 5/2018 | Kitazato |
| 9,986,306 B2 | 5/2018 | Nagorski et al. |
| 9,992,527 B2 | 6/2018 | An et al. |
| 10,200,765 B2 | 2/2019 | Yabu |
| 2002/0083060 A1 | 6/2002 | Wang et al. |
| 2003/0046437 A1 | 3/2003 | Eytchison et al. |
| 2003/0063217 A1 | 4/2003 | Smith |
| 2004/0143349 A1 | 7/2004 | Roberts et al. |
| 2004/0189873 A1 | 9/2004 | Konig et al. |
| 2005/0144455 A1 | 6/2005 | Haitsma |
| 2005/0149968 A1 | 7/2005 | Konig et al. |
| 2006/0062426 A1 | 3/2006 | Levy et al. |
| 2006/0182412 A1 | 8/2006 | Lefevre |
| 2007/0055500 A1 | 3/2007 | Bilobrov |
| 2007/0124756 A1* | 5/2007 | Covell ................ G06Q 30/02 725/18 |
| 2007/0143777 A1* | 6/2007 | Wang .................... H04H 60/27 725/18 |
| 2007/0192782 A1 | 8/2007 | Ramaswamy |
| 2007/0217648 A1 | 9/2007 | Muehlbauer |
| 2008/0060036 A1 | 3/2008 | Cox |
| 2008/0082510 A1 | 4/2008 | Wang et al. |
| 2010/0131970 A1 | 5/2010 | Falcon |
| 2010/0293568 A1 | 11/2010 | Jarman |
| 2010/0329547 A1 | 12/2010 | Cavet |
| 2011/0075851 A1 | 3/2011 | LeBoeuf et al. |
| 2011/0173208 A1 | 7/2011 | Vogel |
| 2011/0273455 A1 | 11/2011 | Powar et al. |
| 2011/0289098 A1 | 11/2011 | Oztaskent et al. |
| 2011/0313856 A1 | 12/2011 | Cohen et al. |
| 2012/0089911 A1 | 4/2012 | Hosking et al. |
| 2012/0117584 A1 | 5/2012 | Gordon |
| 2012/0167140 A1 | 6/2012 | Park et al. |
| 2012/0239175 A1 | 9/2012 | Mohajer et al. |
| 2013/0011008 A1 | 1/2013 | Ikezoye et al. |
| 2013/0052939 A1 | 2/2013 | Anniballi et al. |
| 2013/0054645 A1 | 2/2013 | Bhagavathy et al. |
| 2013/0082097 A1 | 3/2013 | Park et al. |
| 2013/0145414 A1 | 6/2013 | Yamagishi |
| 2013/0152139 A1* | 6/2013 | Davis .................. H04N 21/482 725/61 |
| 2013/0205330 A1 | 8/2013 | Sinha et al. |
| 2013/0212609 A1 | 8/2013 | Sinha et al. |
| 2013/0254793 A1 | 9/2013 | Anniballi et al. |
| 2013/0308818 A1 | 11/2013 | MacIntosh et al. |
| 2013/0326573 A1 | 12/2013 | Sharon et al. |
| 2013/0345840 A1 | 12/2013 | Lempel et al. |
| 2014/0007152 A1 | 1/2014 | Pora et al. |
| 2014/0013352 A1 | 1/2014 | Shavit et al. |
| 2014/0059587 A1 | 2/2014 | Davis et al. |
| 2014/0082655 A1 | 3/2014 | Moon et al. |
| 2014/0089307 A1 | 3/2014 | Garside et al. |
| 2014/0115627 A1 | 4/2014 | Lee et al. |
| 2014/0193027 A1 | 7/2014 | Scherf et al. |
| 2014/0196077 A1 | 7/2014 | Gordon et al. |
| 2014/0236988 A1 | 8/2014 | Harron et al. |
| 2014/0282662 A1 | 9/2014 | Major |
| 2014/0282693 A1 | 9/2014 | Soundararajan et al. |
| 2014/0325555 A1 | 10/2014 | Khader et al. |
| 2014/0337874 A1 | 11/2014 | Kitazato |
| 2015/0020094 A1 | 1/2015 | Moon et al. |
| 2015/0033500 A1 | 2/2015 | Block et al. |
| 2015/0089526 A1 | 3/2015 | Gordon |
| 2015/0106839 A1 | 4/2015 | Shrum, Jr. et al. |
| 2015/0120839 A1 | 4/2015 | Kannan et al. |
| 2015/0181263 A1 | 6/2015 | Gordon et al. |
| 2015/0237409 A1 | 8/2015 | Harper et al. |
| 2015/0289002 A1 | 10/2015 | Choi et al. |
| 2015/0302086 A1 | 10/2015 | Roberts et al. |

(56) References Cited

U.S. PATENT DOCUMENTS

| | | |
|---|---|---|
| 2015/0365709 A1 | 12/2015 | Cho et al. |
| 2016/0094877 A1 | 3/2016 | Heffernan et al. |
| 2016/0127398 A1 | 5/2016 | Cohen |
| 2016/0275588 A1 | 9/2016 | Ye et al. |
| 2016/0316261 A1 | 10/2016 | Koshevoy |
| 2017/0048566 A1 | 2/2017 | Srinivasan |
| 2017/0308556 A1 | 10/2017 | Gonzales-Brenes, Jr. et al. |
| 2017/0330474 A1 | 11/2017 | Rho et al. |

FOREIGN PATENT DOCUMENTS

| | | |
|---|---|---|
| CN | 103581705 | 2/2014 |
| EP | 2 763 427 | 11/2011 |
| EP | 2 704 444 | 3/2014 |
| EP | 3 179 409 | 6/2017 |
| EP | 3 396 562 | 10/2018 |
| JP | 2001298433 | 10/2001 |
| JP | 2011217144 | 10/2011 |
| JP | 2012156643 | 8/2012 |
| JP | 2015008508 | 1/2015 |
| KR | 20130124911 | 11/2013 |
| WO | WO 2005/079499 | 9/2005 |
| WO | WO 2008/042953 | 4/2008 |
| WO | WO 2014/004914 | 1/2014 |

OTHER PUBLICATIONS

International Search Report and Written Opinion from International Application No. PCT/US2017/019974, dated Jun. 15, 2017.
Office Action from U.S. Appl. No. 15/443,580, dated Dec. 14, 2017.
Office Action from U.S. Appl. No. 16/015,811, dated Aug. 23, 2018.

\* cited by examiner

MEDIA CHANNEL IDENTIFICATION AND ACTION WITH MULTI-MATCH DETECTION AND DISAMBIGUATION BASED ON MATCHING WITH DIFFERENTIAL REFERENCE-FINGERPRINT FEATURE

REFERENCE TO RELATED APPLICATIONS

This is a continuation of Ser. No. 15/982,437, filed May 17, 2018, which is a continuation of U.S. patent application Ser. No. 15/442,114, filed Feb. 24, 2017, and issued as U.S. Pat. No. 9,992,533, which claims priority to U.S. Provisional Patent Application No. 62/301,616, filed Feb. 29, 2016, the entirety of each of which is hereby incorporated by reference. In addition, the disclosures of the following applications are hereby incorporated herein by reference in their entirety: (i) U.S. Patent Application Pub. No. 2015/0181263 and (ii) U.S. patent application Ser. No. 15/222,405, filed Jul. 28, 2016.

BACKGROUND

A typical media presentation device operates to receive an analog or digital media stream representing media content such as video and/or audio content and to render and present the media content on a user interface such as a display screen and/or an audio speaker. Examples of such devices include, without limitation, televisions, computer monitors, projection systems, loudspeakers, headphones, and the like.

In many cases, such a media presentation device may be in communication with a receiver, such as a local set top box or other similar device or a remote server, that has access to numerous discrete channels of media content and that can selectively deliver a given such channel's media content to the media presentation device for playout.

By way of example, a television may be communicatively linked with a cable-TV set top box that has access to a set of cable-TV channels, and the set top box may be configured to receive user input selecting a particular channel and to responsively tune to the selected channel and output to the television the media content of the selected channel, for presentation of the media content to a user. As another example, a loudspeaker may be communicatively linked with a radio that has access to a set of radio stations, and the radio may be configured to receive user input selecting a particular channel (station) and to responsively tune to the selected channel and output to the loudspeaker the media content of the selected channel, for presentation of the media content to a user. And as still another example, a media presentation device such as a display or speaker may be communicatively linked with a computer that has access to a myriad of online streaming media channels, and the computer may be configured to receive user input selecting a particular channel and to responsively initiate receipt and output of the selected media content and provide the media content to the display and/or speaker for presentation to a user.

SUMMARY

When a media presentation device receives and renders media content, the media presentation device may not have an indication of which channel carried the media content. A receiver or other device that selectively tunes to the channel and receives the media content and that provides the media content to the media presentation device may have such information, but the media presentation device that receives the media content from that other device may not have such information. For example, if a television is coupled with a cable-TV set top box and a user selects a particular cable channel on the set top box, the set top box may thereby have an indication of the selected channel as the channel on which the set top box is then receiving a media content that is being output to the television. But the television itself may merely receive and render the media content and may have no indication of the selected channel.

For various reasons, however, it may be useful to determine which of various channels is the channel that carries the content being rendered by a media presentation device. Further, it may be useful to do so without receiving from a channel-selection device (e.g., receiver or remote control) a report of the channel to which that device is tuned, and perhaps without any involvement of the channel-selection device. For instance, it may be useful for the media presentation device itself, and/or a network server working in cooperation with the media presentation device, to determine the channel based on an evaluation of the media content that is being rendered (e.g., being already rendered, currently being rendered, or being in queue to be rendered) by the media presentation device. Given knowledge of the channel on which the media content is arriving, the media presentation device, the network server, and/or another entity could then carry out one or more operations keyed to the channel, such as determining and recording an extent to which media content of that channel is being played, selectively replacing a predetermined portion of the media content with alternative content (such as a replacement advertisement), or superimposing channel-specific content over the media content for presentation along with the media content, among numerous other possibilities.

One method to determine the channel on which media content is arriving is to have the media presentation device (or perhaps an adjunct device) and/or a network server generate a digital fingerprint of the media content that is being rendered by the media presentation device, and to then compare that fingerprint with reference fingerprint data established for media content known to be provided on particular channels.

For example, a network server or other such entity may establish or otherwise have access to reference data that includes a reference fingerprint of each of the channels available to provide media content to the media presentation device (e.g., each of the channels within a subscription plan for a set-top box that supplies media content to the media presentation device) and that maps each reference fingerprint to the channel on which the media content is provided. As the media presentation device receives and renders given media content, the media presentation device may then generate a fingerprint of that media content and, through a network communication interface, report the generated fingerprint to the network server for analysis. The network server may then compare the reported fingerprint with the reference fingerprint data to find a match with a reference fingerprint and to thereby determine that the channel on which the media content is arriving is the channel that the reference data maps with that reference fingerprint. Upon thereby determining the channel on which the media content is arriving, the network server may then communicate an indication of the channel to the media presentation device, and the media presentation device may take channel-specific action. Alternatively, the network server itself or another entity may take channel-specific action based on the determined channel.

Unfortunately, however, a problem that can arise in this process is that the same media content may be provided on multiple different channels, whether concurrently or at different times, and so a fingerprint of media content being rendered by a media presentation device may not correlate with just the channel on which the media content is arriving. For example, a sports game or political event might be broadcast concurrently on multiple different channels, or a syndicated television or radio show might be broadcast on multiple different such channels concurrently or at different times. In these or other scenarios, if the media presentation device is presenting such media content and generates and provides a fingerprint of the media content, that fingerprint could be mapped to multiple reference fingerprints, and consequently the channel-identification would be inconclusive.

As a specific example of this, consider a scenario where two different video content providers both broadcast the same sports game, each on a separate respective channel, and where an advertiser has a contract with just one of the content providers to present a pop-up advertisement on that provider's broadcast of the game. In this scenario, when a media presentation device is receiving and presenting one of these broadcasts, if the media presentation device generates and provides to the network server a fingerprint of the broadcast, the network server may determine that the fingerprint matches both content providers' broadcasts of the game, and so it would be unclear whether the media presentation device should present the pop-up advertisement or not.

Disclosed herein are methods and systems to help disambiguate channel identification in a scenario where a fingerprint of media content matches multiple reference fingerprints corresponding respectively with multiple different channels. In accordance with the disclosure, a network server or other entity carrying out this analysis will detect a multi-match scenario by determining that the fingerprint of the media content at issue matches two or more reference fingerprints corresponding respectively with different channels. Faced with the detected multi-match scenario, the entity will then perform disambiguation based on a further more granular fingerprint analysis, to establish that a fingerprint of the media content being rendered by the media presentation device matches a reference fingerprint of just one channel, and to thereby establish that the channel corresponding with the one matching reference fingerprint is the channel on which the media content being rendered by the media presentation device is arriving, so as to facilitate taking channel-specific action.

As a specific example of this process, the server may first conduct a relatively coarse fingerprint comparison, with liberal matching-tolerances or the like, and thereby detect the multi-match scenario. In response, the server may then identify a fingerprint feature that differentiates the multi-match group members from each other. For instance, as to video content, the server may determine that the reference fingerprints of the multi-match group likely differ from each other with respect to a particular video frame region, such as at a video frame edge or the like, represented by a specific fingerprint feature. And the server may then conduct a more refined, granular fingerprint comparison specifically with respect to that fingerprint feature and thereby determine that the fingerprint of the media content being rendered by the media presentation device matches the reference fingerprints.

Accordingly, in one respect, disclosed is a method that involves taking action based on a channel determined through disambiguation based on distinguishing reference-fingerprint feature. The method includes a computing system determining that a query fingerprint of media content being rendered by a media presentation device matches multiple reference fingerprints each corresponding with a different respective channel than each other. Further, the method includes, responsive to at least determining that the query fingerprint matches the multiple reference fingerprints each corresponding with a different respective channel, performing disambiguation by (i) identifying a fingerprint feature that differs as between the multiple reference fingerprints and (ii) determining that the query fingerprint matches just one of the reference fingerprints as to the identified fingerprint feature, thus establishing that the media presentation device is receiving the media content on the channel corresponding with the one reference fingerprint. And the method includes taking action based on establishing that the media presentation device is receiving the media content on the channel corresponding with the one reference fingerprint.

Further, the disclosed method could take other forms as well. For example, the method could include a computing system receiving from a media presentation device a first query fingerprint of video content being rendered by the media presentation device, and the computing system determining that the first query fingerprint matches multiple reference fingerprints each corresponding with a different respective channel than each other. And the method could then include, responsive to at least determining that the first query fingerprint matches the multiple reference fingerprints each corresponding with a different respective channel, the computing system performing disambiguation by (i) identifying a video frame region that defines a difference between the channels corresponding with the multiple reference fingerprints, (ii) requesting and receiving from the media presentation device a second query fingerprint specifically focused on the identified video frame region, (iii) determining that the second query fingerprint matches a reference fingerprint of the video frame region of just one of the multiple channels, thereby establishing that the media presentation device is receiving the video content on the one channel. In turn, the method could then include taking action based on the establishing that the media presentation device is receiving the video content on the channel corresponding with the one reference fingerprint.

Yet further, disclosed is a system including a network communication interface, a processing unit, non-transitory data storage, and program instructions stored in (e.g., on) the non-transitory data storage and executable by the processing unit to carry out operations such as those discussed above.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
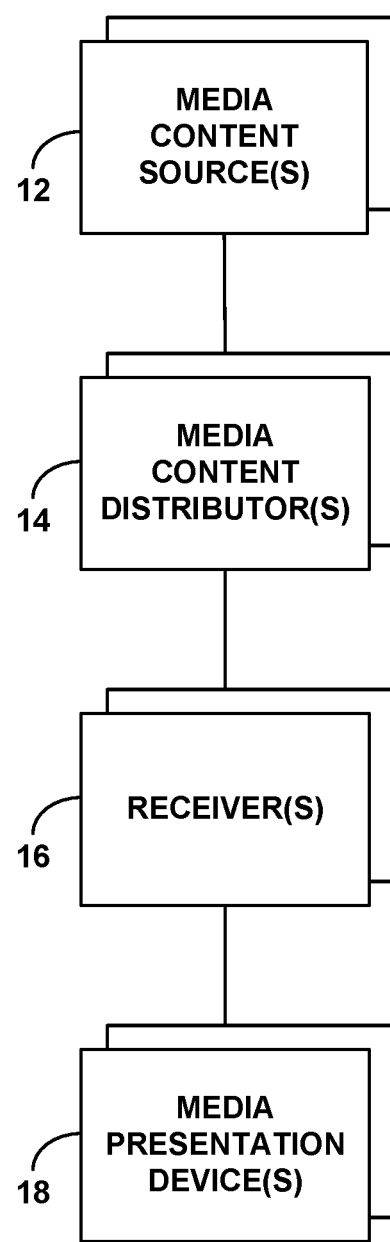
FIG. 1 is a simplified block diagram of an example system in which various disclosed principles can be applied.

Referring to the drawings, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes one or more media content sources 12 (e.g., broadcasters, web servers, etc.), one or more media content distributors 14 (e.g., multi-channel distributors, such as cable providers, satellite providers, over-the-air broadcast providers, web aggregators, etc.), one or more media content receivers 16 (e.g., cable receivers, satellite receivers, over-the-air broadcast receivers, computers or other streaming media receivers, etc.), and one or more clients or media presentation devices 18 (e.g., televisions or other display devices, loudspeakers or other audio output devices, etc.)

In practice, for instance, the media content sources 12 could be national broadcasters, such as ABC, NBC, CBS, FOX, HBO, and CNN, the media content distributors 14 could be local affiliates and/or other local content distributors in particular designated market areas (DMAs), and the receivers 16 and media presentation devices 18 could then be situated at customer premises, such as homes or business establishments. With this or other arrangements, the content sources 12 could deliver media content to the content distributors 14 for distribution to receivers 16 at customer premises, and the content distributors could distribute the media content to the receivers 16 on discrete channels (e.g., particular frequencies). Each receiver could then respond to user input or one or more other triggers by tuning to a selected channel and outputting to a media presentation device 18 the media content that is arriving on the selected channel. And the media presentation device 18 could receive and render the media content (e.g., display or otherwise present the content).

In this arrangement, as the media presentation device receives and renders this media content, the media presentation device may have no indication of the channel on which the media content is arriving, i.e., of the channel to which the receiver is tuned. Rather, the media presentation device may be configured simply to receive the media content as a media stream from the receiver and to render the received media content. Per the present disclosure, however, the media presentation device may be in communication with a network server and may work with the network server to facilitate identification of the channel and thus to facilitate taking useful channel-specific action.

Figure 2:
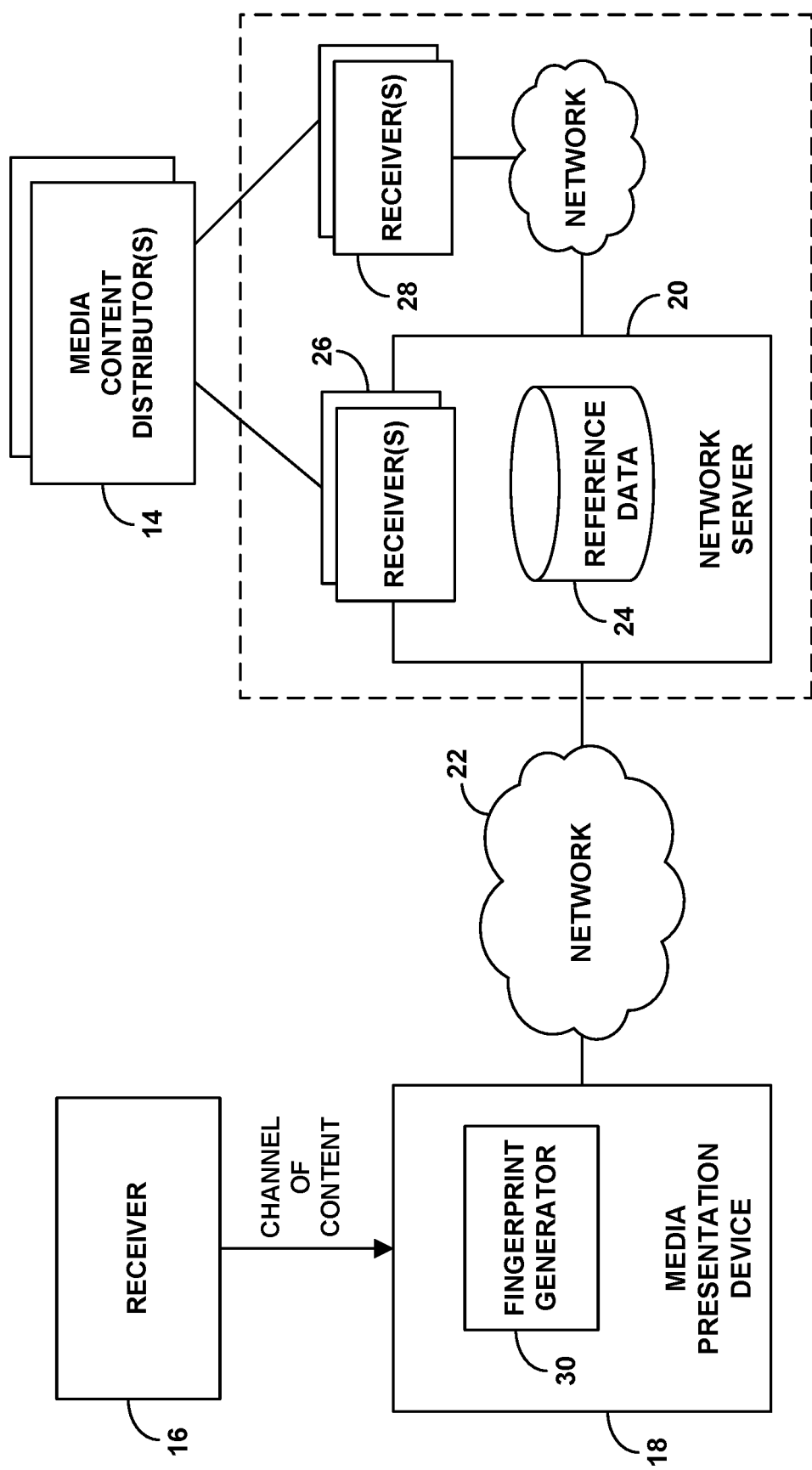
FIG. 2 is a simplified block diagram of an example network arrangement in which a media presentation device communicates with a network server to facilitate implementing various disclosed principles.

FIG. 2 illustrates an example network arrangement in which a media presentation device 18 is in communication with a network server 20 via a network 22, such as the Internet. In practice, the media presentation device 18 may sit as a node on a local area network (LAN) at customer premises, with the media presentation device having an assigned Internet Protocol (IP) address on the LAN and the LAN having an IP address on the Internet. Further, the network server 20 may also be accessible at an IP address on the Internet. With this arrangement, the media presentation device may initiate and engage in IP communication with the network server via the Internet, to report a fingerprint of media content being rendered by the media presentation device, so as to facilitate channel identification and associated action.

As discussed above, the network server 20 or another entity operating in accordance with the present disclosure could establish or have access to reference data 24 for media content that is carried or scheduled to be carried on at least each of various channels accessible to the media presentation device 18. The reference data, which could be stored in a relational database or other form, could include a respective reference fingerprint for each channel, perhaps a reference fingerprint stream of media content that was most recently carried by the channel (e.g., on a sliding window basis covering a most recent period of time). Alternatively or additionally, the reference data could include a respective reference fingerprint (e.g., reference fingerprint stream) of each media content program (e.g., television broadcast, radio broadcast, streaming media file, etc.) that is available and/or scheduled to be carried on a particular channel. As such, the reference data could map each reference fingerprint to a channel on which the associated media content (i.e., the content uniquely identified by the reference fingerprint) is or may be carried.

In mapping reference fingerprints to channels, the reference data could characterize the channels by various attributes, to help distinguish the channels from each other. For example, where a receiver or other such device provides multiple different channels selectable by channel number, the reference data could characterize the channels by their respective channel numbers. And as another example, where each channel carries a particular content source's content, such as the content of one of a particular broadcaster for instance, the reference data could characterize the channels by their respective content sources' identities. Still further, where more than one content distributor (e.g., multichannel distributor) distributes content sources' content, the reference data could characterize the channels by their respective content distributors' identities. And for channels that are broadcast in particular geographic locations, such as a particular DMAs, the reference data could characterize the channels by their broadcast locations. In practice, the reference data could correlate each reference fingerprint with one or more of these or other attributes.

The network server 20 or other entity operating in accordance with the present disclosure could establish some or all of this reference data by analyzing media content arriving on each of the various channels (e.g., at least the media content arriving on each of various channels that are available to a receiver that serves the media presentation device). To facilitate this, as shown, the server could include or be interconnected with one or more receivers 26 that are configured to receive media content from one or more of the media content distributors 14 on various channels in much the same way that receivers would be configured to receive content at customer premises. For instance, the server could include or be interconnected with one or more cable-TV set top boxes, radios, computers, or other media receivers, or could be configured to emulate one or more such receivers. The server could then be configured to receive and analyze the respective media content arriving on each channel and to generate for each channel a reference fingerprint of the channel's media content, using any media fingerprinting process now known or later developed.

Considering video content, without limitation, an example digital fingerprinting process could apply on a per video frame basis and could involve establishing a representation of luminosity and/or other video characteristics. For instance, for a given video frame, the server could programmatically divide the frame into a grid, and the server could measure luminosity of the frame per grid cell and generate a bit string with each bit or series of bits representing luminosity per grid cell, or representing a weighted difference between the luminosity of certain defined pairs of the grid cells, or the like. Further, the computing system could apply this process on an ongoing basis to generate the reference fingerprint as a fingerprint stream over time. For instance, the server could apply this process to each frame, to each key frame, periodically, or on another defined basis, with each frame's bit string defining a digital fingerprint and/or with a specified hash, combination or series of such bit strings or other representative values defining a digital fingerprint, on a sliding window basis. Many other digital fingerprinting processes could be used as well.

In practice, the server could be configured to receive concurrently on multiple such channels (perhaps all of the channels) and to analyze and generate respective reference fingerprints for the channels in parallel, or the server might be configured to hop from channel to channel, possibly repeatedly cycling through the channels, to analyze and generate a respective reference fingerprint for each channel. Further, the server could continue to do this in real-time, saving a respective fingerprint of at least a most recent time window of media content for each channel, for reference. And the server could record each channel's reference fingerprint in the reference data in association with a characterization of the channel (e.g., with attributes such as those noted above) and timestamp information indicating a time of receipt of the associated media content. Here, the server would have knowledge of each channel (e.g., channel number), just as a receiver would normally have knowledge of the channel to which the receiver is tuned. Further, the server may have access to guide information or other such data specifying attributes of each such channel (e.g., content source identity, content distributor identity, etc.), so that the server can determine and record channel attributes respectively for each reference fingerprint.

Alternatively or additionally, the server could receive such reference fingerprints from external media receiver devices 28, such as from media receiver devices located in various respective DMAs. This implementation could be especially useful for channels that are provided only in specific DMAs. In this implementation, each media receiver device 28, perhaps interworking with an associated computer server, could be configured to receive and analyze the respective media content arriving on each channel available to the media receiver device, to generate for each such channel a reference fingerprint (e.g., reference fingerprint stream) of the channel's media content using any fingerprint process now known or later developed, and to provide the reference fingerprint (e.g., periodically or continuously) via a network connection to the server 20. Further, the media receiver device 28 could provide server 20 with information characterizing the channel on which the media content represented respectively by each such reference fingerprint is arriving, such as the channel number and other attributes noted above. And the server could thus record each received fingerprint along with its associated channel attributes.

Still alternatively or additionally, the server could receive or perhaps establish such reference fingerprints for media content programs that are available or scheduled to be provided on particular channels. For instance, providers or distributors of various media content programs could generate reference fingerprints for the media content programs (e.g., reference fingerprint streams over the course of respective media content programs), again using any media fingerprinting process now known or later developed, and those reference fingerprints could be provided to the server. Alternatively, the server could receive advance copies of the media content programs and could itself generate such reference fingerprints. Further, the server could receive or determine from program guide information the channel on which the media content program is available or scheduled to be provided, and perhaps a day and time at which the media content is scheduled to be provided. The server could then record each media content program's reference fingerprint in the reference data in association with the channel on which the media content program is available or scheduled to be carried, likewise with associated channel attributes, and perhaps in association with a day and time at which the media content program is scheduled to be provided.

Given this or other such reference data, when the server is presented with a query fingerprint of media content that was received on an unknown channel, the server could match the query fingerprint with one of the stored reference fingerprints, using any fingerprint comparison process now known or later developed, and could thereby conclude that the media content at issue arrived on the channel that the reference data maps to the matching reference fingerprint.

To facilitate this comparison, the query fingerprint would preferably be generated using the same fingerprinting process that is used to generate each of the reference fingerprints, so that portions of the query fingerprint would correspond with portions of each reference fingerprint. For instance, for video content, the query fingerprint and each reference fingerprint could be generated on a per-frame basis as discussed above, using the same grid and same basis for representing luminosity values and/or other characteristics in the same manner.

To compare the query fingerprint with a reference fingerprint, the server could compare corresponding portions of the fingerprints with each other to determine whether the portions match exactly or within defined tolerances. For example, for video content, the server could conduct this analysis on a whole frame basis, comparing the query fingerprint of a frame against a reference fingerprint of a frame, such as by computing a maximum deviation between the fingerprints and determining if the maximum deviation is within a predefined tolerance. Further, if the fingerprints are binary, this could be a Boolean determination, and if the fingerprints are more complex values, such as decimal values or vectors (e.g., grey values per video frame region), this could involve determining a distance between the values or vectors. Numerous other examples are possible as well.

This fingerprint comparison process could be thus conducted with a desired level of tolerance. For instance, the comparison could be coarse, with relatively high tolerance for differences between the fingerprints, such as with tolerance for a greater number of differences and/or tolerance for a greater size of differences. By way of example, when comparing two 32-bit fingerprints with each other, a coarse comparison may deem the fingerprints to match each other generally even if two or another designated number of bits do not match. Or the comparison could be more granular, with lower tolerance for such differences, and/or with comparisons focused on specific fingerprint components possibly representing specific portions of the underlying media. Further, this comparison could be done on a sliding window basis, by comparing a time segment of the query fingerprint with numerous time segments of the reference fingerprint, or vice versa, to account for time shifting.

Thus, if the server is faced with a query fingerprint of media content that is being rendered by the media presentation device 18, the server could compare the fingerprint with the reference fingerprints in the reference data to determine if the query fingerprint matches a reference fingerprint. And if the server thereby finds a matching reference fingerprint, then the server could identify the channel that the reference data maps with the matching reference fingerprint and could conclude that that is the channel on which the media presentation device is receiving the media content (i.e., that that is the channel carrying the media content being rendered by the media presentation device). In turn, the server could responsively take a channel-specific action based on the identified channel, or cause or enable one or more other entities to take a channel-specific action based on the identified channel.

To facilitate this, the media presentation device 18 or another entity could be configured to generate a fingerprint of the media content that is being rendered by the media presentation device and to transmit the fingerprint to server 20 for analysis.

For instance, as shown in FIG. 2, the media presentation device could include a fingerprint generator 30, which could be configured to generate a digital fingerprint of media content being rendered by the media presentation device. Such a fingerprint generator could be configured to generate the fingerprint of media content as the media presentation device is receiving the media content on a channel from a receiver 16 and/or as the media presentation device is processing the media content for presentation. As such, the fingerprint generator could receive as input a copy of the media content arriving at the media presentation device from the receiver and/or being processed for presentation by the media presentation device, and to generate a fingerprint of the media content, using the same fingerprinting process used to generate the reference fingerprints.

In practice, the fingerprint generator could be configured to generate such a fingerprint as a fingerprint stream on an ongoing basis, such as on a per frame basis (e.g., per key-frame basis) or other basis. And the media presentation device could be configured to transmit the fingerprint via network 22 to a server 20 for analysis. By way of example, the media presentation device could be configured to periodically or from time to time transmit to the server a fingerprint representing a latest frame, series of frames or other segment or portion of the media content being rendered by the media presentation device. In particular, the media presentation device could generate a message carrying the latest generated fingerprint, along with one or more timestamps and/or other such data as well as an identifier of the media presentation device, and could transmit the message to the server's IP address. And the server could thereby receive the fingerprint for analysis.

Alternatively, the media presentation device could transmit to the server, and the server could thus receive, various data regarding the media content being rendered by the media presentation device, likewise on an ongoing basis or other basis, to enable the server itself or another entity to generate a fingerprint of the media content being rendered by the media presentation device. For example, the media presentation device could transmit to the server portions of the media content being rendered by the media presentation device, such as individual frames (e.g., snapshots) or other segments of the media content. And the server could generate a fingerprint of that media content for analysis.

Through the process described above, the server could thus compare the fingerprint of the media content being rendered by the media presentation device with the reference fingerprints in the reference data. And as noted above, if the server thereby finds a matching reference fingerprint, the server could determine the channel that the reference data maps with the matching reference fingerprint and could conclude that the determined channel is the channel carrying the media content being rendered by the media presentation device.

In response to thereby determining the channel at issue, the server could then take, or cause to be taken, one or more channel-specific actions based on the determination of the channel. In particular, the server itself could take action based on the channel determination, or the server could signal to another entity, perhaps to the media presentation device, to cause the other entity to take action based on the channel determination.

For example, the server could record the fact that the media presentation device is presenting content of that particular channel, as part of a channel rating or analytics system to measure the extent to which particular channels are being presented by media presentation devices. For instance, the media presentation device could regularly (e.g., periodically) report to the server a fingerprint of the media content that the media presentation device is rendering, and the server could carry out processes such as those discussed herein to determine the channel being rendered. Each time the server thus determines that a channel is being rendered, the server could add to a count or other statistic of the channel being rendered, as data to indicate the extent to which that channel is being presented. Further, these counts or other statistics could be per media presentation device (as device-specific viewing analytics), indicating the extent to which the media presentation device presents the channel at issue.

As another example, the server could responsively cause the media presentation device to present supplemental content, such as a pop-up advertisement as discussed above, a commercial break, or a channel identification, among other possibilities, possibly as a replacement for one or more portions of the media content. For instance, given knowledge of the channel at issue, the server could generate or select (e.g., from server data storage) particular supplemental media content associated specifically with the determined channel (and perhaps further based on profile data (e.g., device-specific viewing analytics) associated with the particular media presentation device) and could transmit the supplemental media content to the media presentation device for the media presentation device to present in conjunction with the media content that the media presentation device is receiving from the receiver. The media presentation device could thus receive the supplemental media content from the server and present it in conjunction with the media content that the media presentation device is receiving from the receiver.

In practice, this process could involve the server receiving in real-time from the media presentation device a fingerprint of the media content being rendered by the media presentation device and the server determining that the received fingerprint matches a reference fingerprint of media content that the server is concurrently receiving (or has scheduled for the same time) on a known channel.

In some cases, however, there may be a time difference between when the media presentation device renders the media content and timestamps and transmits the fingerprint to the server and when the server receives the media content on the known channel and otherwise has the reference fingerprint timestamped. As noted above, the server could account for this time difference by comparing the received fingerprint over a sliding window of the reference fingerprint or vice versa.

Further, the server could account for this time difference when taking action in response to a determined match between the received fingerprint and the reference fingerprint. For example, if the media presentation device receives the media content sufficiently earlier than the server's timestamp for the content (e.g., more than a few seconds earlier), the server could still identify a fingerprint match and could record analytics data. But in response to detecting that time difference, the server might forgo having the media presentation device present associated supplemental content, to help avoid a situation where the media presentation device presents the supplemental content too late (e.g., out of sync) from a user's perspective. On the other hand, if the server detects a fingerprint match for a sufficient period of time and/or determines that the matching content will continue, the server may have the media presentation device present supplemental content even when faced with such a time difference.

In any event, through these or other such processes, a network server or other entity can determine the channel on which the media presentation device is receiving the media content at issue. And once the entity determines the channel, the entity may then take action based on the channel determination. Alternatively, the entity could signal to another entity, perhaps back to the media presentation device, to cause the other entity to take action based on the channel determination. Other examples are possible as well.

In line with the discussion above, the server 20 or other entity that has access to reference data as noted above could be configured to identify multi-match scenarios, perhaps by detecting among the reference data various reference fingerprints that match each other and that match a fingerprint of media content being rendered by the media presentation device.

In one implementation, for instance, the server could regularly analyze the reference data in search of multi-match scenarios, comparing pairs of reference fingerprints in the reference data using any now known or later developed media fingerprint comparison process, in an effort to find reference fingerprints that match each other. Upon finding each such match of at least two of the reference fingerprints, the server could then flag the reference fingerprints as being a multi-match group. Such a flag could indicate that there will be a potential ambiguity if the fingerprint of media content being rendered by the media presentation device matches any of the reference fingerprints in the flagged multi-match group. The server could flag the reference fingerprints as being a multi-match group in various ways. For instance, the server could cross-reference the reference fingerprints of the multi-match group in the reference data, to indicate that they are members of a multi-match group. Alternatively, the server could store a single copy of the reference fingerprint and associate that copy with various channels on which the media content represented by the reference fingerprint is carried.

With this implementation, when the server receives from a media presentation device a fingerprint of media content being rendered by the media presentation device and the server determines that the received fingerprint matches a reference fingerprint, the server could then readily determine from the reference data whether a multi-match situation exists. If the matching reference fingerprint is not flagged as being a member of a multi-match group, then the server could conclude that a single-match situation (rather than a multi-match situation) exists, in which case, as discussed above, the server could then readily determine from the reference data the channel associated with the matching reference fingerprint and could conclude that that is the channel carrying the media content being rendered by the media presentation device. Whereas, if the matching reference fingerprint is flagged as being a member of a multi-match group, then the server could conclude that a multi-match situation (rather than a single-match situation) exists, in which case the server may need to perform a disambiguation process to help identify the channel at issue from among those associated with the reference fingerprints of the multi-match group.

Alternatively, in another implementation, the server could identify a multi-match group at the time the server receives a fingerprint from the media presentation device. For instance, when (e.g., as) the server receives the fingerprint from the media presentation device, the server could compare the received fingerprint with all of the reference fingerprints in the reference data. If the server thereby detects that the received fingerprint matches only one of the reference fingerprints, then the server could conclude that a single-match situation (rather than a multi-match situation) exists, in which case the server could then readily determine from the reference data the channel associated with the matching reference fingerprint and could conclude that that is the channel carrying the media content being rendered by the media presentation device. Whereas, if the server detects that the received fingerprint matches two or more of the reference fingerprints, then the server could conclude that a multi-match situation (rather than a single-match situation) exists, in which case the server may need to perform a disambiguation process to help identify the channel at issue from among those associated with the reference fingerprints of the multi-match group.

In line with the discussion above, the process of detecting a multi-match situation involving two or more reference fingerprints could be performed even if the two reference fingerprints represent the same media content carried on two different channels at a time delay relative to one another, i.e., where the presentation of the media content on one of the channels is time shifted in relation to presentation of the same media content on another one of the channels. The fingerprint matching process could account for this time shifting and could still find a match if the fingerprints otherwise match each other, such as by comparing one fingerprint over a sliding window with the other fingerprint. For instance, the process of finding matching reference fingerprints within the reference data could involve searching for reference fingerprints that match one another and are presented and/or scheduled at respective times that are within a threshold time interval of each other.

As noted above, when the server or other entity carrying out this analysis detects that the fingerprint of the media content being rendered by the media presentation device matches multiple reference fingerprints corresponding with multiple channels, the entity could apply a disambiguation process to help determine which of the channels associated with the multi-match group is the actual channel carrying the media content being rendered by the media presentation device.

In accordance with the present disclosure, the disambiguation process will be based on a further analysis of at least one fingerprint feature that is likely to differentiate the multi-match group members from each other and that may thus allow matching of the query fingerprint with just one of the reference fingerprints. As such, the fingerprint comparisons that give rise to the multi-match scenario in the first place could be relatively coarse comparisons, such as with relatively high matching tolerances, and the disambiguation process could involve applying a more granular fingerprint comparison with respect to at least one likely-distinguishing fingerprint feature so as to determine that that the query fingerprint matches just one of the reference fingerprints in the multi-match group.

By way of example, the after finding through a coarse fingerprint comparison process that a query fingerprint matches two or more reference fingerprints, the server could then conduct a more granular comparison of the reference fingerprints in the multi-match group to find a fingerprint feature that differs as between the reference fingerprints in the multi-match group. The server could conduct this more granular comparison by applying a more stringent (lower tolerance) comparison between the reference fingerprints, so as to identify a fingerprint component that differs as between the reference fingerprints. Thus, for instance, the server might determine that the reference fingerprints in the multi-match group differ from each other as to a particular set of bits and/or one or more other components or attributes.

Upon identifying this fingerprint feature that differs as between the reference fingerprints in the multi-match group, the server could then conduct a similarly granular comparison of the query fingerprint with the reference fingerprints as to the determined feature. And through this further comparison, the server could determine that the query fingerprint matches just one of the reference fingerprints in the multi-match group, thus establishing that the channel that the reference data maps with that one matching reference fingerprint is the channel carrying the media content being rendered by the media presentation device.

In practice, this process could work in a scenario where the channels represented by the reference fingerprints in the multi-match group present channel-specific media content along with their common underlying media content.

For example, considering television channels that are presenting the same program content as each other, each channel could further present a channel-specific icon (e.g., channel number or logo) in a lower corner of each video frame or of certain video frames. Applying a grid-based fingerprinting process or the like, the fingerprints of these channels' media content could thus generally match each other but could differ as to a fingerprint feature representing the lower corner of those video frames. By conducting a granular comparison of the reference fingerprints, the server could identify such a distinguishing feature. And the server could then conduct a granular comparison of the query fingerprint with each of the multi-match group reference fingerprints as to that feature and thereby determine that the query fingerprint matches just one of the reference fingerprints.

And as another example, considering two television channels that present the same program content as each other but with one in high-definition (HD) and the other in standard-definition (SD), the HD and SD versions of the video content may match each other more at the center of each frame and less at the edges of each frame. Thus, applying a grid-based fingerprinting process or the like, the fingerprints of the channels' media content could generally match each other but could differ as to a fingerprint feature representing an edge of each video frame. By conducting a granular comparison of the reference fingerprints, the server could identify such a distinguishing feature. And similarly, the serer could then conduct a granular comparison of the query fingerprint with each of the multi-match group reference fingerprints as to that feature and thereby determine that the query fingerprint matches just one of the reference fingerprints.

In this disambiguation process, the server could identify the distinguishing fingerprint feature by conducting a granular comparison of the reference fingerprints in the multi-match group as noted above. Alternatively, however, the server could identify the distinguishing fingerprint feature based on known attributes of the channels represented by the reference fingerprints in the multi-match group. For example, the reference data or other channel-data could indicate respectively for each of various channels one or more channel-distinguishing features, such as channel identification that would appear in a specific portion of each frame or of specific frames, or such as the HD or SD nature of the channel. By considering such data for the reference fingerprints in the multi-match group, the server could thus determine that the channels represented by the multi-match group reference fingerprints likely differ from each other as to a particular feature corresponding with a particular fingerprint feature, and the server could then focus its comparison specifically on that fingerprint feature.

In practice, for video content, at issue in this process could be the fingerprint feature that represents a particular video frame region, such as the lower corner of one or more video frames and/or the edges of one or more video frames. Thus, the server could determine the video frame region that would likely distinguish as between the reference fingerprints in the multi-match group, and the server could then focus its analysis specifically on one or more fingerprint features representing that video frame region.

Further, once the server identifies a video frame region at issue, the server could obtain a granular query fingerprint and granular reference fingerprints as to that specific video frame region. For instance, the server could engage in signaling with the media presentation device to cause the media presentation device to generate and provide the server with a granular query fingerprint of the specific video frame region of the video content being rendered by the media presentation device. And the server could similarly generate, or request and receive from media receiver devices or other sources, granular reference fingerprints of the specific video frame region of the video content for each channel associated with the multi-match group. The server could then compare the query fingerprint of that video frame region with the multi-match group reference fingerprints of that video frame region and thereby determine that the query fingerprint matches just one of the reference fingerprints.

Figure 3:
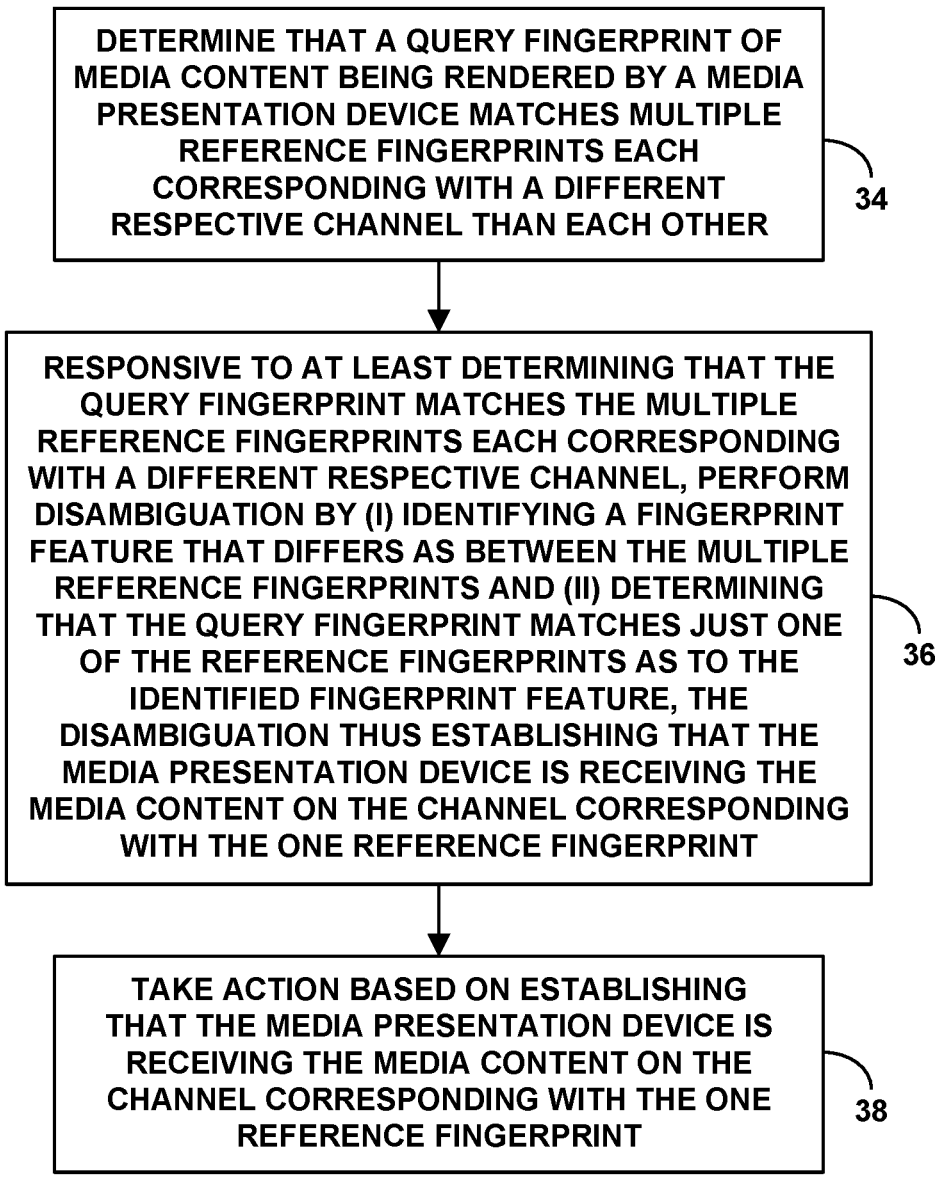
FIG. 3 is a flow chart depicting operations that can be carried out in accordance with the present disclosure.

FIG. 3 is next a flow chart depicting a method that can be carried out in line with the discussion above. One or more of the operations in the method depicted by FIG. 3 could be carried out by one or more entities, including, without limitation, a network server, a media presentation device, and/or one or more entities operating on behalf of or in cooperation with these or other entities. Any such entity could embody a computing system, such as a programmed processing unit or the like, configured to carry out one or more of the method operations. Further, a non-transitory data storage (e.g., disc storage, flash storage, or other computer readable medium) could have stored thereon instructions executable by a processing unit to carry out the various depicted operations.

As shown in FIG. 3, at block 34, the method involves a computing system determining that a query fingerprint of media content (e.g., video content and/or audio content) being rendered by a media presentation device matches multiple reference fingerprints each corresponding with a different respective channel than each other. At block 36, the method then involves, responsive to at least determining that the query fingerprint matches the multiple reference fingerprints each corresponding with a different respective channel, performing disambiguation by (i) identifying a fingerprint feature that differs as between the multiple reference fingerprints and (ii) determining that the query fingerprint matches just one of the reference fingerprints as to the identified fingerprint feature, the disambiguation thus establishing that the media presentation device is receiving the media content on the channel corresponding with the one reference fingerprint.

And at block 38, the method involves taking action based on having established that the media presentation device is receiving the media content on the channel corresponding with the one reference fingerprint. For instance, as noted above, the server or another entity could cause supplemental channel-specific content to be presented by the media presentation device in conjunction with the media content being rendered by the media presentation device and/or the server or another entity could record presentation of the single channel for use in a channel ratings system.

As further discussed above, where the computing system is a server or other entity other than the media presentation device, the media presentation device could generate the query fingerprint of the media content being rendered by the media presentation device, and the computing system could receive that query fingerprint from the media presentation device.

Further, in an example implementation, the multiple reference fingerprints could be selected from a plurality of reference fingerprints in reference data, in which case determining that the query fingerprint of the media content being rendered by the media presentation device matches the multiple reference fingerprints could involve (i) comparing the query fingerprint with the plurality of reference fingerprints in the reference data, and (ii) based on the comparing, determining that the query fingerprint matches the multiple reference fingerprints.

In addition, as discussed above, the act of identifying the fingerprint feature that differs as between the multiple reference fingerprints could involve comparing the multiple reference fingerprints with each other and, based on the comparing, determining that the multiple reference fingerprints differ from each other as to the fingerprint feature.

Alternatively or additionally, the computing system could include or have access to channel-data that indicates for the channels corresponding with the multiple reference fingerprints a region of media content that is channel specific (e.g., a video frame region (e.g., a region at a video frame edge or a region where channel identification is presented), or other region of other type of media content). And in that case, the act of identifying the fingerprint feature that differs as between the multiple reference fingerprints could involve referring to the data to determine the region of media content that is channel specific, and identifying as the fingerprint feature that differs as between the multiple reference fingerprints a fingerprint feature corresponding with the determined region of media content.

Still further, as discussed above, the act of determining that the query fingerprint matches just one of the reference fingerprints as to the identified fingerprint feature could involve comparing at least the identified fingerprint feature in the query fingerprint with the identified fingerprint feature in each of the reference fingerprints and, based on the comparing, determining that the query fingerprint matches just the one reference fingerprint.

Figure 4:
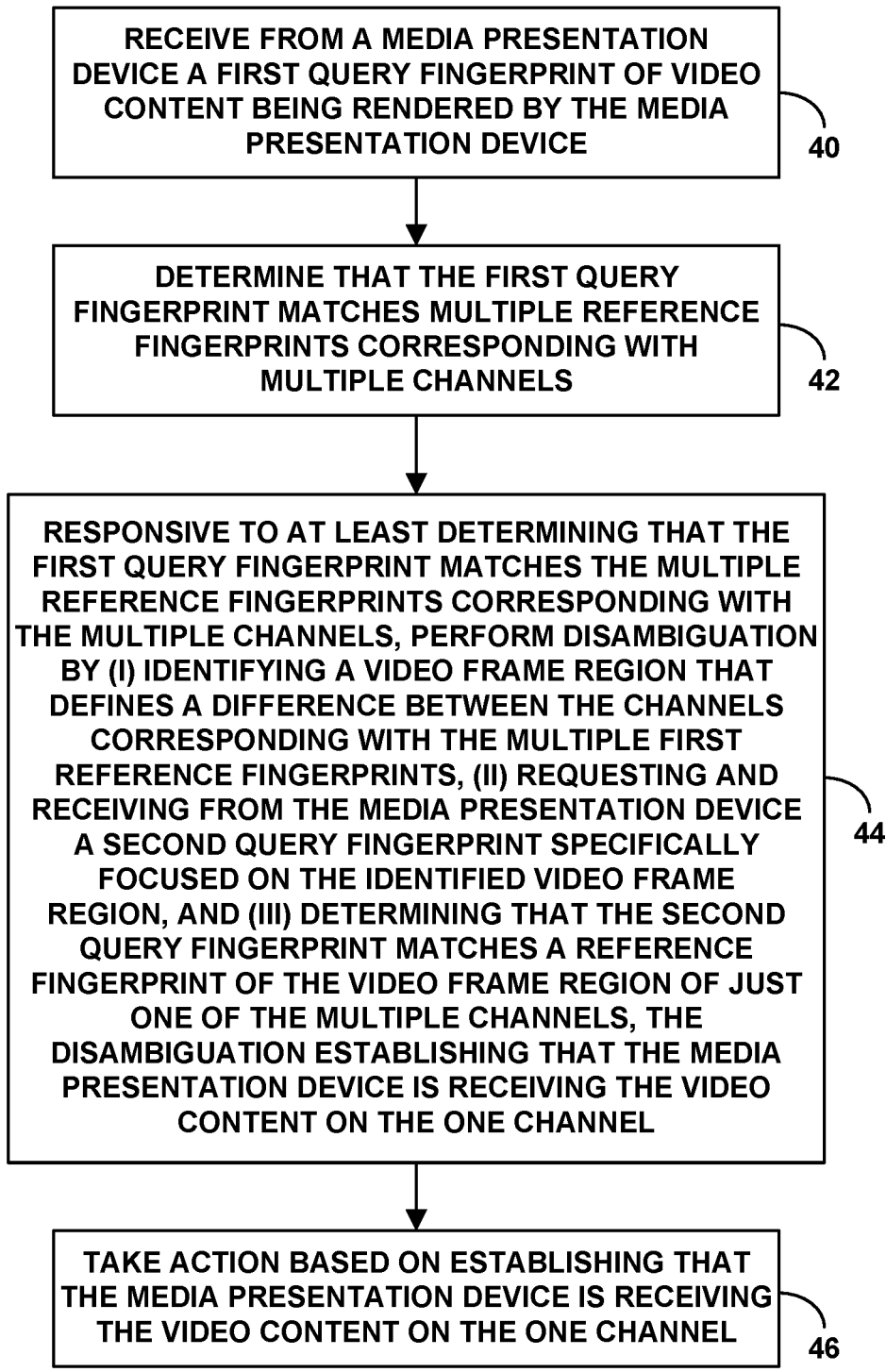
FIG. 4 is another flow chart depicting operations that can be carried out in accordance with the present disclosure.

FIG. 4 is next another flow chart depicting a method that can be carried out in line with the discussion above, which could similarly be implemented by one or more entities and/or embodied on a non-transitory data storage as discussed above.

As shown in FIG. 4, at block 40, the method involves a computing system receiving from a media presentation device a first query fingerprint of video content being rendered by the media presentation device. At block 42, the method then involves the computing system determining that the first query fingerprint matches multiple reference fingerprints corresponding with multiple channels.

At block 44, the method then involves, responsive to at least determining that the first query fingerprint matches the multiple reference fingerprints corresponding with the multiple channels, the computing system performing disambiguation by (i) identifying a video frame region that defines a difference between the channels corresponding with the multiple first reference fingerprints, (ii) requesting and receiving from the media presentation device a second query fingerprint specifically focused on the identified video frame region, and (iii) determining that the second query fingerprint matches a reference fingerprint of the video frame region of just one of the multiple channels, the disambiguation establishing that the media presentation device is receiving the video content on the one channel. And at block 46, the method involves taking action based on having established that the media presentation device is receiving the video content on the one channel.

In line with the discussion above, this method could thus further include, for each channel of the multiple channels, establishing a respective reference fingerprint of the video frame region, to facilitate comparison with the second query fingerprint. Thus, determining that the second query fingerprint matches a reference fingerprint of the video frame region of just one of the multiple channels could involve comparing the second query fingerprint with the established respective reference fingerprints of the video frame region, and determining that the second query fingerprint matches the established respective reference fingerprint of the video frame region of just one of the multiple channels.

Further, various features described above can be carried out in the context of this method, and vice versa.

Figure 5:
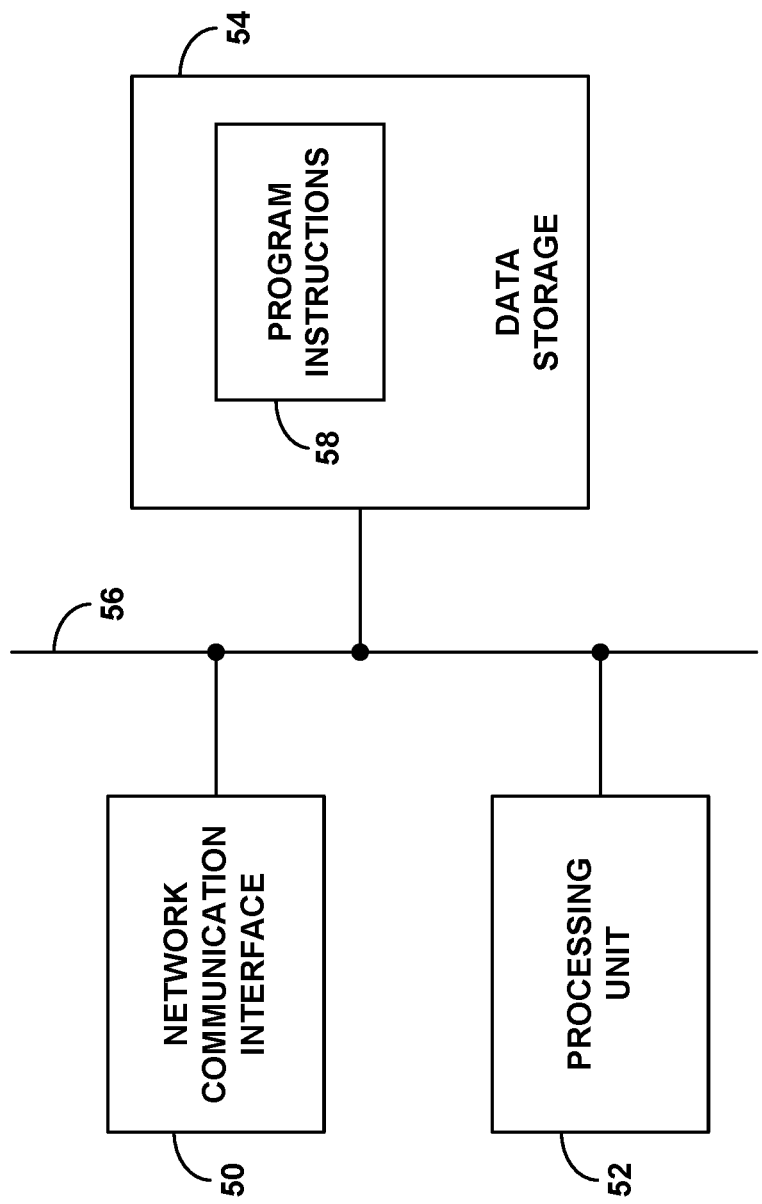
FIG. 5 is a simplified block diagram of an example network server.

FIG. 5 is next a simplified block diagram of an example system operable in accordance with the present disclosure. This system could represent a network server as described above, and/or one or more other entities (possibly including the media presentation device). As shown in FIG. 5, the example system includes a network communication interface 50, a processing unit 52, non-transitory data storage 54, any or all of which could be integrated together or, as shown, communicatively linked together by a system bus, network, or other connection mechanism 56.

Network communication interface 50 could comprise one or more physical network connection mechanisms to facilitate communication on a network such as network 22 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 52, could then comprise one or more general purpose processors (e.g., microprocessors) and/or one or more specialized processors (e.g., application specific integrated circuits). And non-transitory data storage 54 could comprise one or more volatile and/or non-volatile storage components, such as optical, magnetic, or flash storage.

As shown, data storage 54 then stores program instructions 58, which could be executable by processing unit 52 to carry out various operations described herein. For example, the program instructions could be executable to receive from a media presentation device, via the network communication interface, a query fingerprint of media content being rendered by the media presentation device, and to determine that the received fingerprint matches multiple reference fingerprints each corresponding with a different respective channel.

Further, the program instructions could be executable to respond to determining that the received fingerprint matches the multiple reference fingerprints each corresponding with a different respective channel, by performing disambiguation, such as by (i) identifying a fingerprint feature that differs as between the multiple reference fingerprints and (ii) determining that the query fingerprint matches just one of the reference fingerprints as to the identified fingerprint feature, thus establishing that the media presentation device is receiving the media content on the channel corresponding with the one reference fingerprint. And the program instructions could then be executable to take action as discussed above based on the establishing that the single channel carries the media content being rendered by the media presentation device. Further, other features described above could be applied in the context of this system as well, and vice versa.

Figure 6:
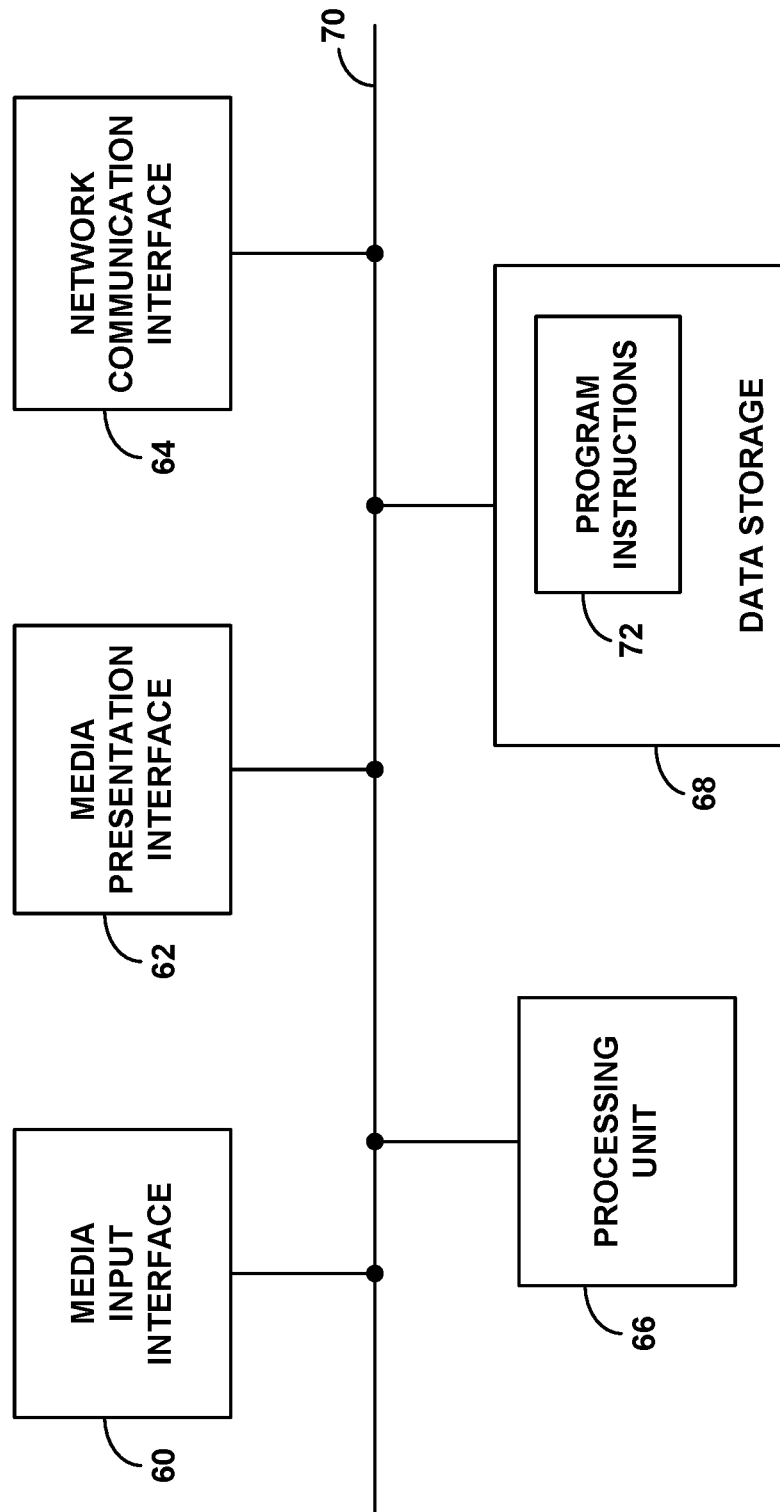
FIG. 6 is a simplified block diagram of an example media presentation device.

Finally, FIG. 6 is a simplified block diagram of an example media presentation device operable in accordance with the present disclosure. In line with the discussion above, this media presentation device could take various forms. For instance, it could be a television, computer monitor, or other device that operates to receive and render video content, and/or it could be a loudspeaker, a pair of headphones, or other device that operates to receive and render audio content. Numerous other examples are possible as well.

As shown in FIG. 6, the example media presentation device includes a media input interface 60, a media presentation interface 62, a network communication interface 64, a processing unit 66, and non-transitory data storage 68, any or all of which could be integrated together or, as shown, communicatively linked together by a system bus, network, or other connection mechanism 70.

Media input interface 60 could comprise a physical communication interface for receiving media content to be presented by the media presentation device. As such, the media input interface could include one or more wired and/or wireless interfaces for establishing communication with and receiving media content in analog or digital form from a receiver or other device or system. For example, the media input interface could include one or more interfaces compliant with protocols such as DVI, HDMI, VGA, USB, BLUETOOTH, WIFI, among numerous others.

Media presentation interface 62 could then comprise one or more components to facilitate presentation of the received media content. By way of example, the media presentation interface could comprise a user interface such as a display screen and/or a loudspeaker, as well as one or more drivers or other components for processing the received media content to facilitate presentation of the content on the user interface.

Network communication interface 64 could comprise a physical network connection mechanism to facilitate communication on a network such as network 22 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 66 could then comprise one or more general purpose processors (e.g., microprocessors) and/or one or more specialized processors (e.g., application specific integrated circuits). And non-transitory data storage 68 could comprise one or more volatile and/or non-volatile storage components, such as optical, magnetic, or flash storage. Further, as shown, data storage 68 stores program instructions 72, which could be executable by processing unit 66 to carry out various operations described here. For example, the program instructions could be executable to generate on an ongoing basis a fingerprint of media content being rendered by the media presentation device, based on analysis of the media content being received at the media input interface 60 and/or being processed at the media presentation interface 62, and to provide the generated fingerprint on an ongoing basis to facilitate channel identification as described herein.

Exemplary embodiments have been described above. Those skilled in the art will understand, however, that changes and modifications may be made to these embodiments without departing from the true scope and spirit of the invention.

What is claimed is:

1. A media presentation device comprising:
   a media input interface through which to receive video content to be presented by the media presentation device, wherein the video content includes video frames having video frame regions, the video frame regions comprising a center, an edge, and a corner;
   a media presentation interface for presenting the received video content;
   a network communication interface;
   a processing unit;
   non-transitory data storage; and
   program instructions stored in the non-transitory data storage and executable by the processing unit to carry out operations comprising:
      generating a first query fingerprint of the video content based on analysis of the video content, and outputting the generated first query fingerprint for transmission through the network communication interface to a server,
      receiving from the server, after outputting the first query fingerprint, a request for a second query fingerprint specifically focused on an identified video frame region of the video frame regions of the video content, wherein the identified video frame region defines a difference between multiple channels that each have a reference fingerprint matching the first query fingerprint, outputting, for transmission through the network communication interface to the server, the requested second query fingerprint specifically focused on the identified video frame region of the video content, and causing the media presentation device to present, in conjunction with the video content that the media presentation device is presenting, supplemental channel-specific content associated with one of the multiple channels, the one channel being identified from among the multiple channels based on a determination that the second query fingerprint matches a reference fingerprint of just the one channel of the multiple channels.

2. The media presentation device of claim 1, wherein the supplemental channel-specific content comprises at least one of a pop-up advertisement, a commercial break, or a channel-identification.

3. The media presentation device of claim 1, wherein the supplemental channel-specific content is a replacement for one or more portions of the video content.

4. The media presentation device of claim 1, wherein the supplemental channel-specific content is additionally based on profile data associated with the media presentation device.

5. The media presentation device of claim 4, wherein the profile data comprises device-specific viewing analytics.

6. The media presentation device of claim 1, wherein the identified video frame region is at least one of (i) at a video frame edge or (ii) where channel identification is presented.

7. A method comprising:

generating by a media presentation device, based on analysis of video content being rendered by the media presentation device, a first query fingerprint of the video content being rendered by the media presentation device, wherein the video content includes video frames having video frame regions, the video frame regions comprising a center, an edge, and a corner;

outputting by the media presentation device the generated first query fingerprint for transmission over a network to a server;

receiving by the media presentation device, from the server, after outputting the first query fingerprint, a request for a second query fingerprint specifically focused on an identified video frame region of the video frame regions of the video content, wherein the identified video frame region defines a difference between multiple channels that each have a reference fingerprint matching the first query fingerprint;

outputting, for transmission over the network to the server, the requested second query fingerprint specifically focused on the identified video frame region of the video content; and presenting by the media presentation device, in conjunction with the video content that the media presentation device is presenting, supplemental channel-specific content associated with an identified one of the multiple channels, the one channel being identified from among the multiple channels based on a determination that the second query fingerprint matches a reference fingerprint of just the one channel of the multiple channels.

8. The method of claim 7, wherein the supplemental channel-specific content comprises at least one of a pop-up advertisement, a commercial break, or a channel-identification.

9. The method of claim 7, wherein the supplemental channel-specific content is a replacement for one or more portions of the video content.

10. The method of claim 7, wherein the supplemental channel-specific content is additionally based on profile data associated with the media presentation device.

11. The method of claim 10, wherein the profile data comprises device-specific viewing analytics.

12. The method of claim 7, wherein the identified video frame region is at least one of (i) at a video frame edge or (ii) where channel identification is presented.

13. The method of claim 7, wherein the identified video frame region is indicated by channel-data accessible to the server.

14. A non-transitory computer readable medium having stored thereon instructions executable by a processing unit to carry out operations including:

generating, based on analysis of video content being rendered by a media presentation device, a first query fingerprint of the video content being rendered by the media presentation device, and outputting the generated first query fingerprint for transmission over a network to a server, wherein the video content includes video frames having video frame regions, the video frame regions comprising a center, an edge, and a corner;

receiving from the server, after outputting the first query fingerprint, a request for a second query fingerprint specifically focused on an identified video frame region of the video frame regions of the video content, wherein the identified video frame region defines a difference between multiple channels that each have a reference fingerprint matching the first query fingerprint;

outputting, for transmission over the network to the server, the requested second query fingerprint specifically focused on the identified video frame region of the video content; and causing the media presentation device to present, in conjunction with the video content that the media presentation device is presenting, supplemental channel-specific content associated with one of the multiple channels, the one channel being identified from among the multiple channels based on a determination that the second query fingerprint matches a reference fingerprint of just the one channel of the multiple channels.

15. The non-transitory computer readable medium of claim 14, wherein the supplemental channel-specific content comprises at least one of a pop-up advertisement, a commercial break, or a channel-identification.

16. The non-transitory computer readable medium of claim 14, wherein the supplemental channel-specific content is a replacement for one or more portions of the video content.

17. The non-transitory computer readable medium of claim 14, wherein the supplemental channel-specific content is additionally based on profile data associated with the media presentation device.

18. The non-transitory computer readable medium of claim 17, wherein the profile data comprises device-specific viewing analytics.

19. The non-transitory computer readable medium of claim 14, wherein the identified video frame region is at least one of (i) at a video frame edge or (ii) where channel identification is presented.

20. The non-transitory computer readable medium of claim 14, wherein the video frame region is indicated by channel-data accessible to the server.

* * * * *